Feb. 27, 1934.  R. B. LEWIS, JR  1,948,793
METHOD OF MAKING VALVES
Filed May 24, 1932

Richard B. Lewis Jr.
Inventor

By
Attorney

Patented Feb. 27, 1934

1,948,793

UNITED STATES PATENT OFFICE 1,948,793

METHOD OF MAKING VALVES

Richard B. Lewis, Jr., St. Cloud, Minn., assignor to Aluminum Industries, Inc., Cincinnati, Ohio Application May 24, 1932. Serial No. 613,317

11 Claims. (Cl. 29—156.7)

My invention relates to valves and to a method of making the same, and is particularly well adapted to the making of poppet valves of the type used in internal combustion engines, although not restricted to this use.

There is a large demand for two piece valves in which a part of the valve is adapted to withstand high temperatures, particularly for use as exhaust valves in internal combustion engines or the like, but great difficulty has been experienced in producing a valve of this character which will stand up under the heat and strains to which it is subjected in use. Much of this difficulty has been due to the inability of manufacturers to obtain a proper junction between the two parts of the valve, and as a consequence, valves of this character have been subject to breakage at the junction of the two parts of the valve.

An important object of my invention is to obviate these difficulties and produce a bi-metallic valve which will be as strong as a one piece valve and yet have all of the advantages to be derived from forming a valve from separate pieces of metal.

Another object of my invention is to provide a method of making valves which is simple and inexpensive and which will produce a strong and durable valve.

Other objects of my invention will be apparent during the course of the following description.

Figure 1:
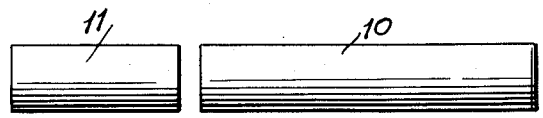
Figure 2:
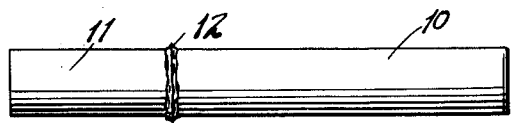
Figure 3:
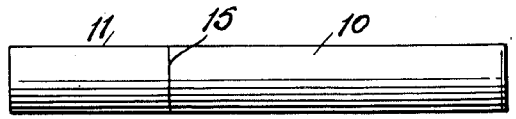
Figure 4:
Figure 5:
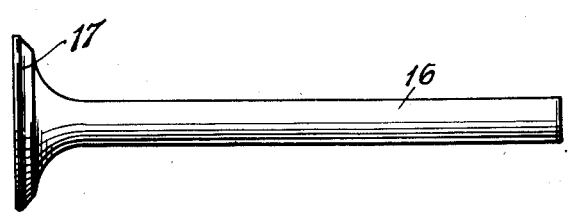
Figure 6:
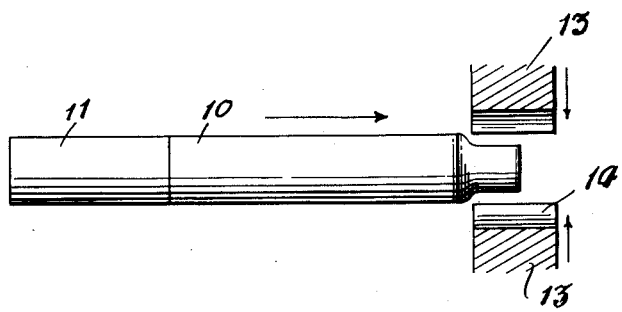
Figure 7:
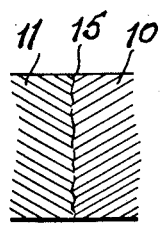
Figure 8:
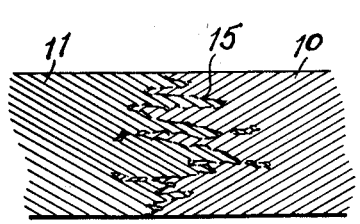

In the accompanying drawing, which forms a part of this specification and wherein like characters of reference denote like parts throughout the same, Figure 1 is a side elevation of the blanks for forming the valve, Figure 2 is a similar view of the blanks after welding, Figure 3 shows the blanks after the weld has been trimmed, Figure 4 shows the blanks after the swaging operation, Figure 5 shows the valve after the head has been forged, Figure 6 is a diagrammatic view illustrating the swaging operation, Figure 7 is a sectional view through the weld joint of the blanks, and, Figure 8 is a similar view after the swaging and lengthening step.

In the drawing wherein for the purpose of illustration is shown a preferred embodiment of my invention the numeral 10 indicates a blank for forming the valve stem and 11 indicates the blank for forming the valve head. The blanks 10 and 11 are cylindrical and have a diameter substantially greater than the diameter of the finished valve stem and substantially less than the diameter of the finished valve head. The blanks 10 and 11 may be of any suitable material. It is desirable, however, to use a high grade heat resisting steel for the head and a comparatively low grade steel for the stem. For example, I may form the head from stainless steel and the stem from a low price carbon steel or alloy. A stainless steel containing approximately 10 to 12% chrome may be used with success and an example of a low grade steel suitable for this purpose is a steel such as is known to the trade as S. A. E. 3140. The above steels are illustrative only, and obviously other suitable metals may be employed.

The stem blank 10 is substantially longer than the head blank 11 and the two blanks are butt welded in any suitable manner, as for instance, by electric flash welding to form an integral cylindrical blank having a welding fin 12 as seen in Figure 2. The fin 12 is next trimmed off and a smooth cylindrical blank such as shown in Figure 3 is produced. The weld joint at this stage of the process, is represented by the irregular line in Figure 7. This type of joint, however, has been found to be faulty and will not stand up under the high temperatures and strains to which it is subjected in use.

The next step is the swaging operation illustrated in Figure 6. The blank is hammered or swaged between two opposed hammers or dies 13 provided with semi-circular grooves 14. The blank is swaged from its stem end to a point beyond the weld indicated by line 15 and is moved progressively through the hammers in the direction indicated by the arrow in Figure 6. The dies are reciprocated as indicated by the arrows and impart relatively heavy blows to the blank.

This swaging operation reduces the diameter of the blank and at the same time lengthens or draws the blank to a substantial extent. The head end of the blank 11 remains at its original diameter, and after the swaging operation the blank has the form shown in Figure 4, the welded portion being within the reduced stem portion. The head portion is then forged or pressed into shape to form a valve having a reduced stem 16 and a head 17 and the valve is annealed, machined and finished to produce the valve shown in Figure 5.

The swaging is preferably carried out while the blank is heated, although for some types of metal heating is not necessary. The same is true of the forging operation. The annealing step may be carried out before the forging operation if desired but if the head is heated to a high temperature for forging it may be necessary to again anneal the valve.

Where the valve is heated for swaging and forging, it is preferable to heat the valve before both operations.

The swaging operation, due to the lengthening of the stem and to its reduction in thickness, spreads out the weld joint as indicated diagrammatically in Figure 8. It will be seen that the hammering and lengthening of the stem results in a thorough merging of the two pieces of metal as contrasted to the weld joint illustrated in Figure 7, and produces a valve which is homogeneous and which will not break down during use. The finished valve will withstand high temperatures, and yet will not be expensive due to the relatively small amount of high grade metal used in each valve. Owing to the thorough merging of the two pieces of metal making up the valve, heat will flow readily from the head to the stem and the head will therefore operate at a lower temperature than is possible with the usual weld joint.

While I have shown and described the preferred embodiment of my invention it is to be understood that various changes in the steps and arrangement of steps of my method may be resorted to without departing from the spirit of my invention or the scope of the subjoined claims.

Having thus described my invention, what I claim and desire to protect by Letters Patent is:

1. The method of forming a valve which comprises butt welding a pair of metal blanks, swaging the blanks to reduce their diameter and increase their length, and forming a valve head from one of said blanks.

2. The method of forming a valve which comprises butt welding a pair of metal blanks, hammering the blanks from the end of one of the blanks to a point between the weld joint and the end of the other blank to reduce the thickness of the blanks and increase their length, and forming a valve head from the unreduced portion of the blank.

3. The method of forming a valve which comprises butt welding a pair of metal blanks, hammering the blanks from the end of one of the blanks to a point between the weld joint and the end of the other blank to reduce the thickness of the blanks and increase their length, forming a valve head from the unreduced portion of the blank, and annealing and finishing the valve.

4. The method of making a valve which comprises butt welding a pair of metal blanks, trimming the weld joint, swaging the blanks from the end of one blank to a point between the weld joint and the end of the other blank to reduce the thickness of the blanks and increase their length, and forming a valve head from the unswaged portion of the blank.

5. The method of making a valve which comprises butt welding a pair of metal blanks, trimming the weld joint, swaging the blanks from the end of one blank to a point between the weld joint and the end of the other blank to reduce the thickness of the blanks and increase their length, forming a valve head from the unswaged portion of the blank, and annealing and finishing the valve.

6. The method of making a valve which comprises butt welding a pair of substantially cylindrical metal blanks, trimming the weld joint, swaging the blanks progressively from the end of one blank to a point between the weld joint and the end of the other blank to reduce the diameters of the blanks and increase their length, and forming a valve head from the unswaged portion of the blank.

7. The method of making a poppet valve which comprises butt welding a low grade steel blank to a high grade steel blank, swaging the welded blanks from the end of the low grade steel blank to a point between the weld joint and the end of the high grade steel blank to reduce the thickness of the blanks and increase their length, and forming a valve head from the unswaged portion of the high grade steel blank.

8. The method of making a poppet valve which comprises butt welding a low grade steel blank to a relatively high chrome steel blank, trimming the weld joint, and swaging the welded blanks from the end of the low grade steel blank to a point between the weld joint and the end of the chrome steel blank to reduce the thickness of the blanks and increase their length, whereby the metal of one blank is merged with that of the other blank, and forming a valve head from the unswaged portion of the chrome steel blank.

9. The method of making a poppet valve which comprises electrically butt welding a pair of metal blanks, trimming the weld joint, heating the blanks, swaging the blanks from the end of one blank to a point between the weld joint and the end of the other blank, heating the unswaged portion of the blank and forming the valve head therefrom.

10. The method of making poppet valves which consists in welding a relatively long low grade steel blank end to end with a relatively short high grade steel blank, trimming the weld joint, heating the blanks, imparting a series of relatively heavy blows to the blanks from the end of the low grade steel blank to a point between the weld joint and the end of the high grade steel blank, whereby a merging of the metal of one blank with that of the other blank is effected, forming a valve head from the end of the high grade steel blank, and annealing and finishing the valve.

11. The method of making poppet valves which consists in welding a relatively long low grade steel blank end to end with a relatively short high grade steel blank, trimming the weld joint, heating the blanks, imparting a series of relatively heavy blows to the blanks from the end of the low grade steel blank to a point between the weld joint and the end of the high grade steel blank, whereby a merging of the metal of one blank with that of the other blank is effected, forming a valve head from the end of the high grade steel blank, and annealing and finishing the valve, whereby a homogeneous joining of the two parts of the valve is obtained which permits an unimpaired flow of heat from the head to the stem of the valve.

RICHARD B. LEWIS, Jr.